(12) United States Patent
Kawai

(10) Patent No.: US 11,380,187 B2
(45) Date of Patent: Jul. 5, 2022

(54) INFORMATION PROCESSING APPARATUS, CONTROL METHOD, AND PROGRAM

(71) Applicant: NEC Corporation, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/624,650

(22) PCT Filed: Jun. 23, 2017

(86) PCT No.: PCT/JP2017/023259
§ 371 (c)(1),
(2) Date: Dec. 19, 2019

(87) PCT Pub. No.: WO2018/235279
PCT Pub. Date: Dec. 27, 2018

(65) Prior Publication Data
US 2020/0184797 A1  Jun. 11, 2020

(51) Int. Cl.
*G08B 21/22* (2006.01)
(52) U.S. Cl.
CPC .................................... *G08B 21/22* (2013.01)
(58) Field of Classification Search
CPC ...................................................... G08B 1/08
See application file for complete search history.

(56) References Cited

U.S. PATENT DOCUMENTS

| 6,151,581 A * | 11/2000 | Kraftson ................ G06Q 40/08 705/3 |
| 7,138,921 B1 * | 11/2006 | Fontaine .............. G08B 13/196 340/573.4 |
| 2002/0191819 A1 | 12/2002 | Hashimoto et al. |
| 2006/0049936 A1 * | 3/2006 | Collins, Jr. .......... A61G 7/0527 340/539.11 |
| 2008/0272918 A1 * | 11/2008 | Ingersoll ............ G08B 21/0446 340/573.1 |

(Continued)

FOREIGN PATENT DOCUMENTS

| JP | 08-263750 A | 10/1996 |
| JP | 2004-133494 A | 4/2004 |

(Continued)

OTHER PUBLICATIONS

International Search Report of PCT/JP2017/023259 dated Sep. 12, 2017.

(Continued)

*Primary Examiner* — Nabil H Syed
*Assistant Examiner* — Cal J Eustaquio
(74) *Attorney, Agent, or Firm* — Sughrue Mion, PLLC

(57) ABSTRACT

An information processing apparatus (2000) detects an assistance-needing-person (30) and an assister (40) present around the assistance-needing-person (30) at a surveillance target location. The detection of the assistance-needing-person (30) and the assister (40) is performed using various sensors. The information processing apparatus (2000) performs any one or more of decision as to whether or not to perform notification related to the assistance-needing-person (30) and decision of a content of the notification based on detection results of the assistance-needing-person (30) and the assister (40).

17 Claims, 15 Drawing Sheets

ASSISTANCE-NEEDING-PERSON 30 : PRESENCE
ASSISTER 40 : PRESENCE

ASSISTANCE-NEEDING-PERSON 30 : PRESENCE
ASSISTER 40 : ABSENCE

BASED ON DETECTION RESULT OF ASSISTANCE-NEEDING-PERSON 30 AND ASSISTER 40,
(1) DECIDE WHETHER OR NOT TO PERFORM NOTIFICATION RELATED TO ASSISTANCE-NEEDING-PERSON 30
(2) DECIDE CONTENT OF NOTIFICATION RELATED TO ASSISTANCE-NEEDING-PERSON 30
PERFORM ANY ONE OR MORE OF DESCRIBED ABOVE

(56) References Cited

U.S. PATENT DOCUMENTS

| | | | | |
|---|---|---|---|---|
| 2012/0075464 A1* | 3/2012 | Derenne | ............... | H04N 7/185 |
| | | | | 348/135 |
| 2012/0102559 A1* | 4/2012 | Yoshida | ............. | G06F 21/6245 |
| | | | | 726/7 |
| 2014/0142963 A1* | 5/2014 | Hill | ....................... | G16H 10/60 |
| | | | | 705/2 |
| 2018/0068179 A1* | 3/2018 | Derenne | ............. | G08B 21/043 |

FOREIGN PATENT DOCUMENTS

| | | |
|---|---|---|
| JP | 2010-172548 A | 8/2010 |
| JP | 2013-206338 A | 10/2013 |
| JP | 2015-016704 A | 1/2015 |
| JP | 2016-003097 A | 1/2016 |
| JP | 2016-064910 A | 4/2016 |
| JP | 2017-028364 A | 2/2017 |
| WO | 02/056251 A1 | 7/2002 |

OTHER PUBLICATIONS

Communication dated Nov. 10, 2020 by the Japanese Patent Office in application No. 2019-524838.
Japanese Office Communication for JP Application No. 2021-018134 dated Feb. 22, 2022 with English Translation.

\* cited by examiner

FIG. 1

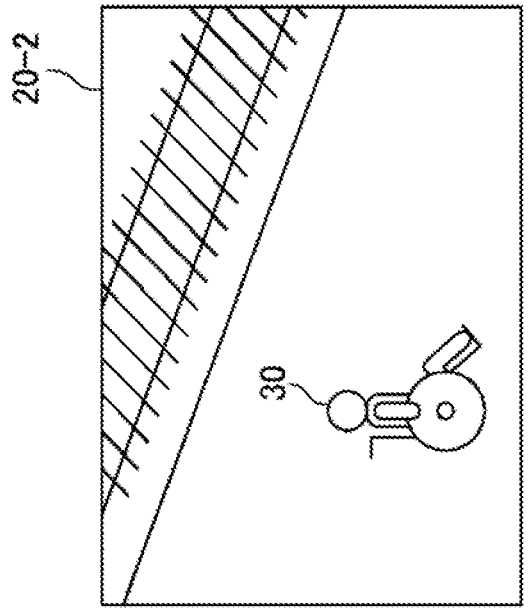

ASSISTANCE-NEEDING-PERSON 30 : PRESENCE
ASSISTER 40 : PRESENCE

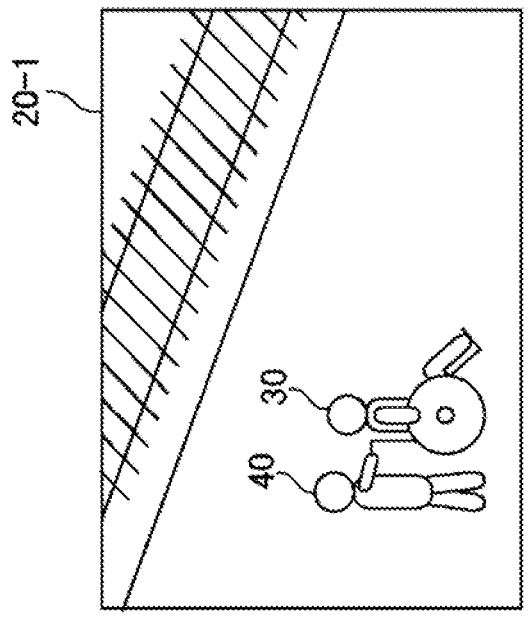

ASSISTANCE-NEEDING-PERSON 30 : PRESENCE
ASSISTER 40 : ABSENCE

BASED ON DETECTION RESULT OF ASSISTANCE-NEEDING-PERSON 30 AND ASSISTER 40,
(1) DECIDE WHETHER OR NOT TO PERFORM NOTIFICATION RELATED TO ASSISTANCE-NEEDING-PERSON 30
(2) DECIDE CONTENT OF NOTIFICATION RELATED TO ASSISTANCE-NEEDING-PERSON 30
PERFORM ANY ONE OR MORE OF DESCRIBED ABOVE

FIG. 12

| RANKS | SITUATION CONDITION |
|---|---|
| 1 | PASSING THROUGH NARROW PLACE (PLATFORM, SIDEWALK, ETC.) |
| 2 | BEING STUCK OR STAYING |
| 3 | HAVING TROUBLE WITH OTHERS |
| 4 | GETTING WORSE PHYSICAL CONDITION (DECREASED CONSCIOUSNESS, VOMITING, ETC.) |
| 5 | ENTERING DANGEROUS LOCATION (SUCH AS FALLING ON TRACK, ETC.) |

INFORMATION PROCESSING APPARATUS, CONTROL METHOD, AND PROGRAM

CROSS REFERENCE TO RELATED APPLICATIONS

This application is a National Stage of International Application No. PCT/JP2017/023259 filed Jun. 23, 2017.

TECHNICAL FIELD

The present invention relates to image analysis.

BACKGROUND ART

A person who needs any assistance like a person having a disability, an ill person, or a person in bad condition may be present at various locations. For example, Patent Document 1 and Patent Document 2 are exemplified as a technology for detecting such an assistance-needing-person.

Patent Document 1 discloses a technology for detecting a person in bad condition or the like from a video and performing alerting in a case where the detected person enters an alert area. Patent Document 2 discloses a technology for detecting a wheelchair using a sensor disposed on a floor and outputting an alarm in a case where the detected wheelchair enters a dangerous section.

RELATED DOCUMENT

Patent Document

[Patent Document 1] Japanese Patent Application Publication No. 2017-28364
[Patent Document 2] Japanese Patent Application Publication No. 2004-133494

SUMMARY OF THE INVENTION

Technical Problem

There is a possibility that a person or the like that already assists an assistance-needing-person is present. For example, such a possibility is a case where a person who attends a person in bad condition is present, or a person having a vision disability is accompanied by a guide dog. In such a case, it is not always necessary to perform alerting.

The present invention is conceived in view of the above problem. One object of the present invention is to provide a technology for flexibly deciding necessity of notification related to an assistance-needing-person or a content of the notification.

Solution to Problem

A first information processing apparatus of the present invention includes 1) a first detection unit that detects a person satisfying a predetermined condition, 2) a second detection unit that detects an accompanying object present around the detected person, 3) a decision unit that performs any one or more of decision as to whether or not to perform notification related to the person and decision of a content of the notification based on detection results of the first detection unit and the second detection unit, and 4) a notification unit that performs the notification based on the decision.

A second information processing apparatus of the present invention includes 1) an assistance dog detection unit that detects an assistance dog from a captured image, and 2) an assistance needing assistance-needing-person detection unit that detects a person assisted by the assistance dog based on a detection result of the assistance dog.

A second control method of the present invention is executed by a computer. The control method includes 1) a first detection step of detecting a person satisfying a predetermined condition, 2) a second detection step of detecting an accompanying object present around the detected person, 3) a decision step of performing any one or more of decision as to whether or not to perform notification related to the person and decision of a content of the notification based on detection results of the first detection step and the second detection step, and 4) a notification step of performing the notification based on the decision.

A third control method of the present invention is executed by a computer. The control method includes 1) an assistance dog detection step of detecting an assistance dog from a captured image, and 2) an assistance-needing-person detection step of detecting a person assisted by the assistance dog based on a detection result of the assistance dog.

A first program of the present invention causes a computer to execute each step of the first control method of the present invention.

A second program of the present invention causes a computer to execute each step of the second control method of the present invention.

Advantageous Effects of Invention

According to the present invention, a technology for flexibly deciding necessity of notification related to an assistance-needing-person or a content of the notification is provided.

BRIEF DESCRIPTION OF THE DRAWINGS

The above object and other objects, features, and advantages will become more apparent from exemplary example embodiments set forth below and the following drawings appended thereto.

FIG. 1 is a diagram for conceptually describing an operation of an information processing apparatus according to Example Embodiment 1.

FIG. 12 is a diagram illustrating situation conditions to which ranks are assigned in a table format.

Figure 2:
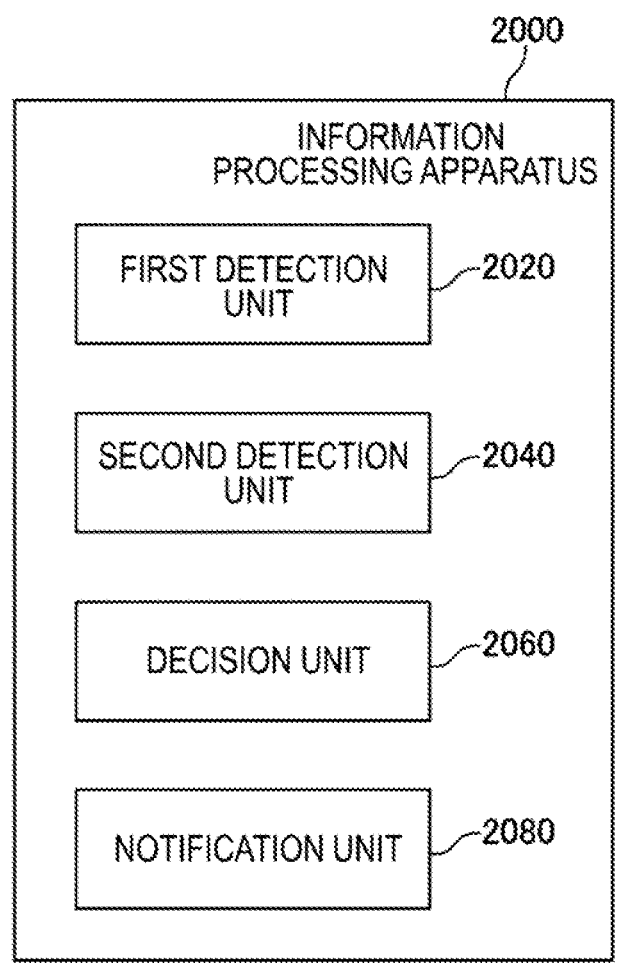
FIG. 2 is a block diagram illustrating an example of a functional configuration of the information processing apparatus according to Example Embodiment 1.

DESCRIPTION OF EMBODIMENTS drawings. Note that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

Example Embodiment 1

<Summary of Operation of Information Processing Apparatus 2000>

FIG. 1 is a diagram for conceptually describing an operation of an information processing apparatus (information processing apparatus 2000 illustrated in FIG. 2 and the like described below) according to Example Embodiment 1. Note that FIG. 1 is an illustrative diagram for easy understanding of the operation of the information processing apparatus 2000. The operation of the information processing apparatus 2000 is not limited to FIG. 1.

The information processing apparatus 2000 detects an assistance-needing-person 30 and an accompanying object (assister 40) who is present around the assistance-needing-person 30, and performs notification based on the detection result. The assistance-needing-person 30 is a person who is estimated to need any assistance. For example, in FIG. 1, the assistance-needing-person 30 is a person who uses a wheelchair. The assister 40 is a person who is estimated to assist the assistance-needing-person 30. For example, in FIG. 1, the assister 40 is a person who pushes the wheelchair used by the assistance-needing-person 30. Other examples of the assistance-needing-person 30 and the assister 40 will be described below.

A surveillance target location can be any location and may be an indoor or outdoor location. For example, the surveillance target location is a facility such as a station or a shopping center or a surrounding area of the facility.

The detection of the assistance-needing-person 30 and the assister 40 is performed using various sensors. One example of the sensors is a camera. In the case of using the camera, the information processing apparatus 2000 detects the assistance-needing-person 30 and the assister 40 by analyzing a captured image generated by the camera. In the example in FIG. 1, a captured image 20 is generated by the camera. The assistance-needing-person 30 and the assister 40 are detected from a captured image 20-1. On the other hand, from a captured image 20-2, only the assistance-needing-person 30 is detected, and the assister 40 is not detected.

Another example of the sensors is a pressure sensor. The pressure sensor is installed on the ground where a person passes in the surveillance location. In the case of using the pressure sensor, the information processing apparatus 2000 detects the assistance-needing-person 30 and the assister 40 based on a detection signal generated by the pressure sensor.

Note that the sensor used for detecting the assistance-needing-person 30 and the sensor used for detecting the assister 40 may be the same as each other or may be different from each other.

The detection results of the assistance-needing-person 30 and the assister 40 are used for the notification related to the assistance-needing-person 30. For example, the information processing apparatus 2000 decides whether or not to perform the notification based on the detection results of the assistance-needing-person 30 and the assister 40. As a more specific example, in a case where the assistance-needing-person 30 is detected, but the assister 40 is not detected (for example, in the case of the captured image 20-2 in FIG. 1), the information processing apparatus 2000 decides to perform the notification. On the other hand, in a case where both of the assistance-needing-person 30 and the assister 40 are detected (for example, in the case of the captured image 20-1 in FIG. 1), the information processing apparatus 2000 does not perform the notification. By deciding whether or not to perform the notification considering the detection result of the assistance-needing-person 30 and also the detection result of the assister 40, the necessity of the notification can be flexibly decided.

Besides, for example, the information processing apparatus 2000 decides the content of the notification based on the detection results of the assistance-needing-person 30 and the assister 40. As a more specific example, the information processing apparatus 2000 performs the notification having different contents between a case where both of the assistance-needing-person 30 and the assister 40 are detected and a case where only the assistance-needing-person 30 is detected. By deciding the content of the notification considering the detection result of the assistance-needing-person 30 and also the detection result of the assister 40, the content of the notification can be flexibly decided. More specifically, in a situation where an assistance-needing-person is present, it is possible to separately perceive a situation where appropriate assistance is provided and a situation where appropriate assistance is not provided.

Hereinafter, the information processing apparatus 2000 of the present example embodiment will be described in further detail.

<Example of Functional Configuration of Information Processing Apparatus 2000>

FIG. 2 is a block diagram illustrating an example of a functional configuration of the information processing apparatus 2000 according to Example Embodiment 1. The information processing apparatus 2000 includes a first detection unit 2020, a second detection unit 2040, a decision unit 2060, and a notification unit 2080. The first detection unit 2020 detects a person (assistance-needing-person 30) who satisfies a predetermined condition. The second detection unit 2040 detects the assister 40 present around the assistance-needing-person 30. The decision unit 2060 performs any one or more of decision as to whether or not to perform the notification related to the assistance-needing-person 30 and decision of the content of the notification related to the assistance-needing-person 30 based on the detection results of the first detection unit 2020 and the second detection unit 2040. The notification unit 2080 performs the notification based on the decision.

<Example of Hardware Configuration of Information Processing Apparatus 2000>

Each functional configuration unit of the information processing apparatus 2000 may be implemented by hardware (for example, a hardwired electronic circuit) that implements each functional configuration unit, or may be implemented by a combination of hardware and software (for example, a combination of an electronic circuit and a program controlling the electronic circuit). Hereinafter, a case where each functional configuration unit of the information processing apparatus 2000 is implemented by a combination of hardware and software will be described.

Figure 3:
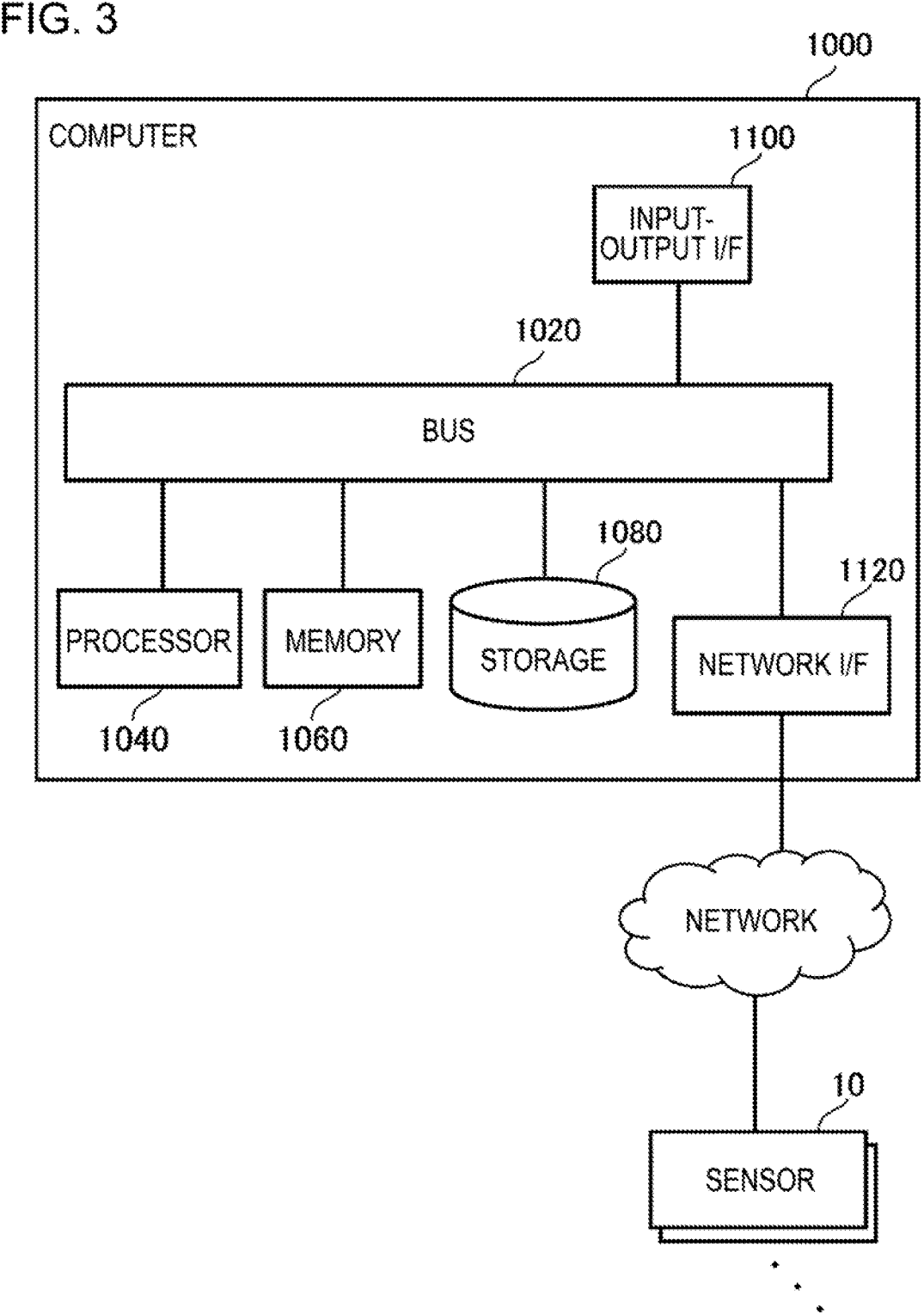
FIG. 3 is a diagram illustrating a computer for implementing the information processing apparatus.

FIG. 3 is a diagram illustrating a computer 1000 for implementing the information processing apparatus 2000. The computer 1000 is any computer. For example, the computer 1000 is a personal computer (PC), a server machine, a tablet terminal, or a smartphone. Besides, for example, in a case where the camera is used for detecting the assistance-needing-person 30 and the assister 40, the computer 1000 may be the computer. The computer 1000 may be a dedicated computer designed to implement the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transfer path for transmission and reception of data among the processor 1040, the memory 1060, the storage device 1080, the input-output interface 1100, and the network interface 1120. A method of connecting the processor 1040 and the like to each other is not limited to bus connection. The processor 1040 is an operation processing apparatus such as a central processing unit (CPU) or a graphics processing unit (GPU). The memory 1060 is a main storage device that is implemented using a random access memory (RAM) or the like. The storage device 1080 is an auxiliary storage device that is implemented using a hard disk, a solid state drive (SSD), a memory card, a read only memory (ROM), or the like.

The input-output interface 1100 is an interface for connecting the computer 1000 to input-output devices. The network interface 1120 is an interface for connecting the computer 1000 to a communication network. For example, the communication network is a local area network (LAN) or a wide area network (WAN). A method of connecting the network interface 1120 to the communication network may be wireless connection or may be wired connection.

In FIG. 3, the computer 1000 is communicably connected to a sensor 10 through the network. The sensor 10 is a sensor (for example, the camera or the pressure sensor) used for detecting the assistance-needing-person 30 and the assister 40. A method of communicably connecting the computer 1000 to the sensor 10 is not limited to connection through the network. In addition, the computer 1000 may acquire the detection result (the captured image generated by the camera, the detection signal generated by the pressure sensor, or the like) of the sensor 10 using any method and does not need to be communicably connected to the sensor 10.

The storage device 1080 stores a program module that implements each functional configuration unit (the first detection unit 2020, the second detection unit 2040, the decision unit 2060, and the notification unit 2080) of the information processing apparatus 2000. The processor 1040 implements a function corresponding to each program module by reading each program module into the memory 1060 and executing the program module.

<Sensor 10>

The sensor 10 is any sensor that can be used for detecting the assistance-needing-person 30 and the assister 40. For example, as described above, the sensor 10 is the camera or the pressure sensor. The camera is any camera that can generate a plurality of captured images by repeatedly performing capturing. The camera may be a video camera generating video data or may be a still camera generating still image data. Note that in the former case, the captured image is a video frame constituting the video data. The camera may be a two-dimensional camera or may be a three-dimensional camera (a stereo camera or a depth camera). In addition, the camera may be a camera capturing visible light or may be a camera (for example, an infrared camera) capturing invisible light.

A part or all of the functions of the information processing apparatus 2000 may be implemented by the camera used for detecting the assistance-needing-person 30 and the assister 40. For example, the functions of the first detection unit 2020 and the second detection unit 2040 are implemented in the camera, and the functions of the decision unit 2060 and the notification unit 2080 are implemented in a server apparatus that is communicably connected to the camera. In this case, for example, the camera detects the assistance-needing-person 30 and the assister 40 using the captured image generated by the camera and transmits information indicating the detection results to the server apparatus. The server apparatus performs the decision related to the notification based on the received information and performs the notification based on the decision.

Besides, for example, all of the functions of the information processing apparatus 2000 may be implemented in the camera. In this case, the camera detects the assistance-needing-person 30 and the assister 40 using the captured image generated by the camera, performs the decision related to the notification based on the detection results, and performs the notification based on the decision.

For example, a camera called an intelligent camera, a network camera, or an Internet Protocol (IP) camera can be used as the camera having a part or all of the functions of the information processing apparatus 2000.

<Flow of Process>

Figure 4:
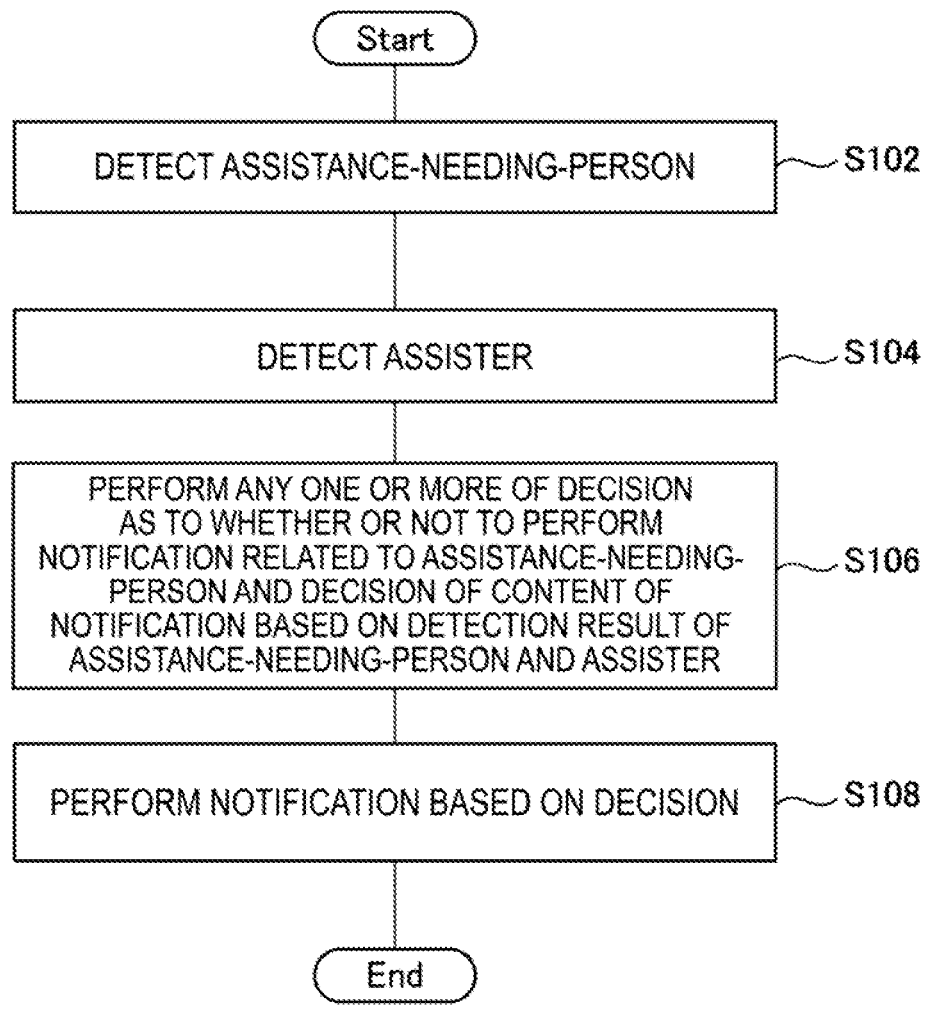
FIG. 4 is a flowchart illustrating a flow of process executed by the information processing apparatus of Example Embodiment 1.

FIG. 4 is a flowchart illustrating a flow of process executed by the information processing apparatus 2000 of Example Embodiment 1. The first detection unit 2020 detects the assistance-needing-person 30 (S102). The second detection unit 2040 detects the assister 40 (S104). The decision unit 2060 performs any one or more of decision as to whether or not to perform the notification related to the assistance-needing-person 30 and decision of the content of the notification related to the assistance-needing-person 30 based on the detection results of the assistance-needing-person 30 and the assister 40 (S106). The notification unit 2080 performs the notification based on the decision (S108).

Note that the flow of process performed by the information processing apparatus 2000 is not limited to the flow illustrated in FIG. 4. For example, the detection of the assister 40 may be performed before the detection of the assistance-needing-person 30. For example, in a case where a guide dog is detected from the captured image, the guide dog can be handled as the assister 40. Then, by using the detection result of the sensor 10 related to the surrounding area of the detected guide dog, the assistance-needing-person who is assisted by the guide dog can be detected.

<Timing at which Information Processing Apparatus 2000 Executes Process>

The information processing apparatus 2000 executes the series of processes illustrated in FIG. 4 at various timings. For example, each time detection is performed by the sensor, the information processing apparatus 2000 executes the series of processes illustrated in FIG. 4 based on the detection result.

Besides, for example, the information processing apparatus 2000 executes the series of processes illustrated in FIG. 4 at predetermined time intervals (for example, every one second). In this case, for example, the information processing apparatus 2000 performs the series of processes illustrated in FIG. 4 using each detection result (for example, using a plurality of captured images 20 generated for one second) that is generated by the sensor after a time when the series of processes illustrated in FIG. 4 are performed.

<Acquisition of Detection Result of Sensor 10>

The first detection unit 2020 acquires the detection result of the sensor 10 in order to detect the assistance-needing-person 30. For example, in a case where the sensor 10 is the camera, the first detection unit 2020 acquires the captured image 20 generated by the camera.

Besides, for example, in a case where the sensor 10 is the pressure sensor, the first detection unit 2020 acquires the detection signal generated by the pressure sensor. For example, the detection signal of the pressure sensor is an electric signal that indicates a change in time of a pressure distribution detected by the pressure sensor. Note that the pressure distribution means a distribution of the magnitude of the pressure detected at each position of a detection range (predetermined region on the ground) of the pressure sensor. Hereinafter, the detection result of the sensor 10 such as the captured image generated by the camera and the detection signal generated by the pressure sensor will be collectively referred to as "detection information".

The first detection unit 2020 acquires the detection information using any method. For example, the first detection unit 2020 receives the detection information transmitted from the sensor 10. Besides, for example, the first detection unit 2020 accesses the sensor 10 and acquires the detection information stored in the sensor 10.

Note that the sensor 10 may store the detection information in a storage device that is disposed outside the sensor 10. In this case, the first detection unit 2020 accesses the storage device and acquires the detection information.

In a case where a part or the whole of the information processing apparatus 2000 is implemented by the camera, the information processing apparatus 2000 acquires the captured image 20 generated by the information processing apparatus 2000 as the detection information. In this case, for example, the captured image 20 is stored in the memory 1060 or the storage device 1080 (refer to FIG. 3) inside the information processing apparatus 2000. Therefore, the first detection unit 2020 acquires the captured image 20 from the memory 1060 or the storage device 1080.

A method of acquiring the detection information by the second detection unit 2040 is the same as the method of acquiring the detection information by the first detection unit 2020.

<Detection of Assistance-Needing-Person 30: S102>

The first detection unit 2020 detects the assistance-needing-person 30 using the sensor 10 (S102). The assistance-needing-person 30 is a person who is estimated to need any assistance. Various persons can be handled as the assistance-needing-person. For example, the assistance-needing-person includes a person having a disability, an injured person, a senior person, an ill person, and a person in bad condition (drunk person and the like).

A method of detecting the assistance-needing-person varies depending on the type of sensor 10 used for detection. Hereinafter, each of a case where the sensor 10 is the camera and a case where the sensor 10 is the pressure sensor will be illustratively described.

<<Case where Sensor 10 is Camera>>

The first detection unit 2020 detects the assistance-needing-person 30 using the captured image 20 generated by the camera. In a case where a person having a disability or an injured person is handled as the assistance-needing-person 30, for example, the first detection unit 2020 detects a person who uses a predetermined assistance tool such as a wheelchair or a cane from the captured image 20 and handles the person as the assistance-needing-person 30. Note that existing technologies can be used as a technology for detecting the assistance tool or the person using the assistance tool from the captured image.

For example, feature values representing various assistance tools and feature values representing persons are defined in advance and stored in the storage device accessible from the first detection unit 2020. The feature value is one or more scalar values or vector values representing an exterior feature (a shape, a pattern, a color, or the like) of an object. The first detection unit 2020 detects the persons and the assistance tools from the captured image 20 by feature value matching using the feature values. For example, the first detection unit 2020 detects the person of which the distance to the detected assistance tool is smaller than or equal to a predetermined value as the assistance-needing-person 30. The predetermined value is stored in advance in the storage device accessible from the first detection unit 2020.

It is assumed that a senior person is handled as the assistance-needing-person 30. Existing technologies can be used as a technology for detecting the senior person from the captured image. For example, the first detection unit 2020 detects persons from the captured image 20 and estimates the age of each detected person. The first detection unit 2020 handles the person of which the estimated age is greater than or equal to a predetermined value (for example, 70) as the assistance-needing-person 30.

It is assumed that an ill person or a person in bad condition is handled as the assistance-needing-person 30. In this case, for example, the first detection unit 2020 handles a person moving on a predetermined course (for example, a meandering course) as an ill person or a person in bad condition. For example, a drunk person is considered as a person who meanderingly moves. Specifically, the first detection unit 2020 detects persons from a plurality of captured images 20 in time series and determines the course of movement of each person. The first detection unit 2020 detects a person moving on the predetermined course as the assistance-needing-person 30. Existing technologies can be used as a technology for determining the course of movement of the persons detected from the plurality of captured images in time series.

Besides, for example, the first detection unit 2020 handles a person taking a predetermined pose as an ill person or a person in bad condition. The predetermined pose is a pose such as bending down, sleeping, or falling down. Specifically, the first detection unit 2020 detects persons from the plurality of captured images 20 in time series and determines the pose of each person. The first detection unit 2020 detects a person in the predetermined pose as the assistance-needing-person 30. Existing technologies can be used as a technology for determining the pose of the person included in the captured image.

<<Case where Sensor 10 is Pressure Sensor>>

In a case where a person having a disability or an injured person is handled as the assistance-needing-person 30, for example, the first detection unit 2020 detects the person using the assistance tool using the detection signal generated by the pressure sensor. For example, a predetermined pattern of a change in time of the pressure distribution detected by the pressure sensor during movement of the person using the assistance tool is defined in advance. The first detection unit 2020 detects the assistance-needing-person 30 by determining whether or not the detection signal output from the sensor 10 matches the predetermined pattern (for example, whether or not a similarity is greater than or equal to a predetermined value).

For example, a test in which the person using the assistance tool moves on the pressure sensor can be performed in advance, and the predetermined pattern can be set based on the detection signal obtained from the pressure sensor during the test. For example, the predetermined pattern is stored in the storage device accessible from the first detection unit 2020.

In a case where a person having a disability or an injured person is handled as the assistance-needing-person 30, for example, the first detection unit 2020 determines the course of the moving person using the detection signal of the pressure sensor. The first detection unit 2020 detects the person moving on the predetermined course (for example, the meandering course) as the assistance-needing-person 30. Note that existing technologies can be used as a technology for determining the course of a moving object using a change in time of the pressure distribution obtained from the pressure sensor.

<Detection of Assister 40: S104>

The second detection unit 2040 detects the assister 40 using the sensor 10 (S104). The assister 40 is a person or an animal that assists the assistance-needing-person 30 (assister) around the assistance-needing-person 30. In a case where the assister is a person, for example, the assister includes a person pushing a wheelchair, a person guiding the assistance-needing-person, and a person supporting the body of the assistance-needing-person. In a case where the assister is an animal, for example, the assister is an assistance dog (a guide dog, a hearing dog, a service dog, or the like).

A method of detecting the assister varies depending on the type of sensor 10 used for detection. Hereinafter, each of a case where the sensor 10 is the camera and a case where the sensor 10 is the pressure sensor will be illustratively described.

<<Case where Sensor 10 is Camera>>

The second detection unit 2040 detects the assister 40 using the captured image 20 generated by the camera. For example, from the plurality of captured images 20 in time series, the second detection unit 2040 detects a person or an animal (for example, a dog) that is present for a predetermined period or longer at a position within a predetermined distance from the assistance-needing-person 30 detected by the first detection unit 2020, and handles the detected person or animal as the assister 40. Besides, for example, the second detection unit 2040 detects a person who is in contact with the assistance-needing-person 30 detected by the first detection unit 2020 for a predetermined period or longer as the assister 40 from the plurality of captured images in time series.

Note that in a case where a dog is detected from the captured image 20, the second detection unit 2040 may determine whether or not the dog is the assistance dog, and handle only the assistance dog as the assister 40. In other words, a stray dog, a general pet dog, or the like is not handled as the assister 40. For example, the assistance dog and other dogs can be determined based on the clothes or equipment of the dog.

Note that the second detection unit 2040 may change the method of detecting the assister 40 depending on the attribute of the assistance-needing-person 30. For example, in a case where the assistance-needing-person 30 is a person who uses a wheelchair, the first detection unit 2020 detects a person pushing the wheelchair from the captured image 20 and detects the person as the assister 40. Besides, for example, in a case where the assistance-needing-person 30 is a person having a vision disability, the first detection unit 2020 detects a person in front of the assistance-needing-person 30 as the assister 40 among persons present for a predetermined period or longer at a position within a predetermined distance from the assistance-needing-person 30. Existing technologies can be used as a technology for detecting a person having a vision disability from the captured image. For example, a person having a white cane can be detected as a person having a vision disability.

<Case where Assister 40 is Detected Earlier than Assistance-Needing-Person 30>

In the information processing apparatus 2000, the assister 40 may be detected by the second detection unit 2040, and then, the first detection unit 2020 may detect the assistance-needing-person 30 based on the detection result. In this case, for example, the second detection unit 2040 detects a person satisfying a predetermined condition as the assister 40. More specifically, the second detection unit 2040 detects a person taking a predetermined pose as the assister 40. For example, the predetermined pose includes a pose of pushing a wheelchair and a pose of supporting another person.

Besides, for example, the second detection unit 2040 detects an animal satisfying a predetermined condition as the assister 40. For example, in a case where animals are prohibited from entering the surveillance location, when an animal is detected from the captured image 20, the second detection unit 2040 handles the animal as the assister 40. Note that the second detection unit 2040 may not detect all animals and may detect only dogs. Besides, for example, the second detection unit 2040 may detect an assistance dog from the captured image 20 and handle the detected assistance dog as the assister 40. A method of detecting the assistance dog is the same as described above.

The first detection unit 2020 detects the assistance-needing-person 30 based on the detection result of the assister 40 provided by the second detection unit 2040. For example, from the plurality of captured images 20 in time series, the first detection unit 2020 detects a person present for a predetermined period or longer at a position within a predetermined distance from the assister 40 and handles the detected person as the assistance-needing-person 30. Besides, for example, from the plurality of captured images 20 in time series, the first detection unit 2020 detects a person who is in contact with the assister 40 detected by the second detection unit 2040 for a predetermined period or longer, and handles the detected person as the assistance-needing-person 30.

<Correspondence Relationship Between Assistance-Needing-Person 30 and Assister 40>

A correspondence relationship between the assistance-needing-person 30 and the assister 40 (relationship between the assistance-needing-person 30 and the assister 40 assisting the assistance-needing-person 30) is not limited to a one-to-one relationship. For example, a plurality of assisters 40 assisting the assistance-needing-person 30 may be present. Conversely, one assister 40 may assist a plurality of assistance-needing-persons 30.

Figure 5:
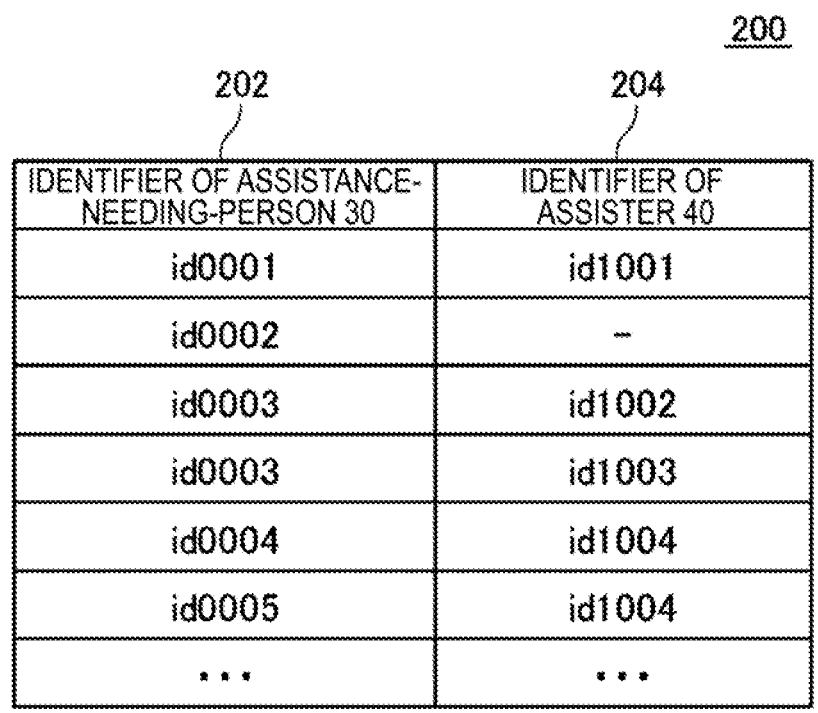
FIG. 5 is a diagram illustrating data representing a correspondence relationship between an assistance-needing-person and an assister.

The correspondence relationship between the assistance-needing-person 30 and the assister 40 is represented as data in any format. FIG. 5 is a diagram illustrating the data representing the correspondence relationship between the assistance-needing-person 30 and the assister 40. The table in FIG. 5 is referred to as a table 200. In the table 200, an identifier 202 of the assistance-needing-person 30 is associated with an identifier 204 of the assister 40 assisting the assistance-needing-person 30. Note that the identifier of the assistance-needing-person 30 is an identifier that is set for identifying each of a plurality of assistance-needing-persons 30. Any identifier can be set by the first detection unit 2020. The same applies to the identifier of the assister 40. Note that the record in the second row of the table 200 represents that the assister 40 is not present for the assistance-needing-person 30 having an identifier id0002.

<Notification Performed by Notification Unit 2080: S108>

The notification performed by the notification unit 2080 will be described before a description of the decision related to the notification performed by the decision unit 2060. The notification unit 2080 performs the notification based on the decision performed by the decision unit 2060 (S108).

The notification is performed by the notification unit 2080 in various manners. For example, the notification is visual notification displayed on a display device, message notification performed through a mail or the like, or audio notification output from a speaker.

The notification performed by the notification unit 2080 is output to various locations. For example, the notification is output from a display device, a speaker, or the like installed in a room (a staff room, a security office, or the like) used by staff or a security guard working at the surveillance location. Besides, for example, the notification may be output from a display device or a speaker disposed in a portable terminal possessed by staff or the security guard. Besides, for example, the notification may be output from a display device, a speaker, or the like installed in a surveillance center or the like where one or more surveillance locations are collectively kept under surveillance.

It is assumed that an output device such as the display device or the speaker used for outputting the notification is directly connected to the information processing apparatus 2000. In this case, the notification unit 2080 causes the output device to output the notification by controlling the output device. On the other hand, in a case where the output device is not directly connected to the information processing apparatus 2000, the notification unit 2080 transmits the notification to another computer that includes the output device. For example, in a case where the information processing apparatus 2000 is implemented as a server apparatus, and the output of the notification is performed by the portable terminal of the security guard, the notification unit 2080 transmits the notification to the portable terminal of the security guard.

<Decision as to Whether or not to Perform Notification: S106>

The decision unit 2060 performs any one or more of (1) decision as to whether or not to perform the notification related to the assistance-needing-person 30 and (2) decision of the content of the notification related to the assistance-needing-person 30 based on the detection results of the first detection unit 2020 and the second detection unit 2040 (S106). The case of (1) will be described.

Various methods of deciding whether or not to perform the notification by the decision unit 2060 are present. For example, in a case where the assistance-needing-person 30 is detected, and the assister 40 is not detected for the assistance-needing-person 30, the decision unit 2060 decides to perform the notification. On the other hand, in both of a case where the assistance-needing-person 30 is not detected, and a case where the assistance-needing-person 30 is detected and the assister 40 is detected for the assistance-needing-person 30, the decision unit 2060 decides not to perform the notification.

Figure 6:
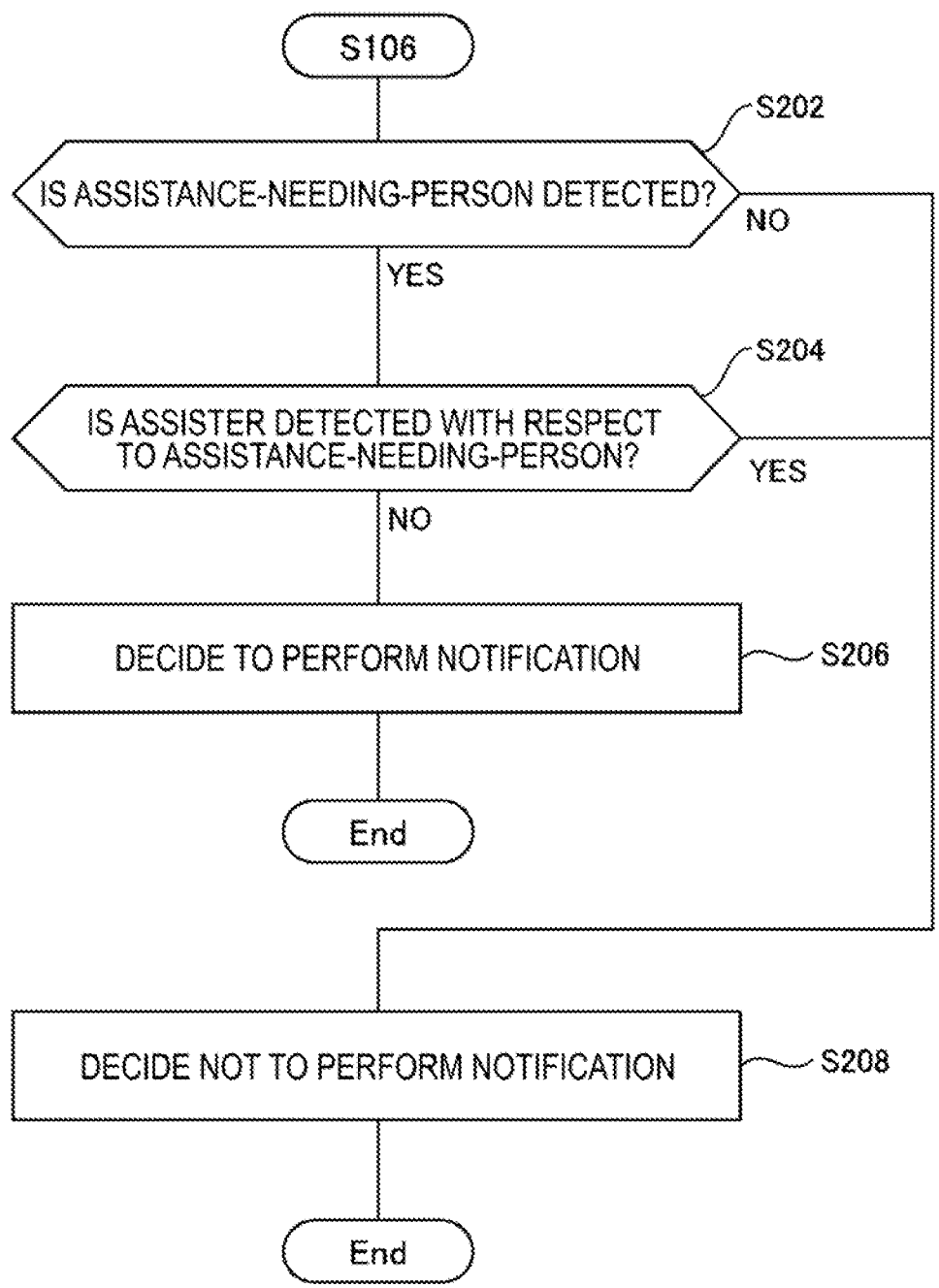
FIG. 6 is a flowchart illustrating a flow of process of deciding whether or not to perform notification.

FIG. 6 is a flowchart illustrating a flow of process of deciding whether or not to perform the notification. The decision unit 2060 determines whether or not the assistance-needing-person 30 is detected (S202). In a case where the assistance-needing-person 30 is detected (S202: YES), the decision unit 2060 determines whether or not the assister 40 is detected for the assistance-needing-person 30 (S204). In a case where the assister 40 is not detected for the assistance-needing-person 30 (S204: NO), the decision unit 2060 decides to perform the notification (S206). On the other hand, in a case where the assistance-needing-person 30 is not detected (S202: NO), or in a case where the assister 40 is detected for the assistance-needing-person 30 (S204: YES), the decision unit 2060 decides not to perform the notification (S208).

For example, the notification is notification indicating that a person to be assisted is present. For example, the notification indicates the position, the detection time, and the like of the detected assistance-needing-person 30. Furthermore, in a case where the assistance-needing-person 30 is detected using the captured image, the notification may include the captured image in which the assistance-needing-person 30 is detected.

Figure 7:
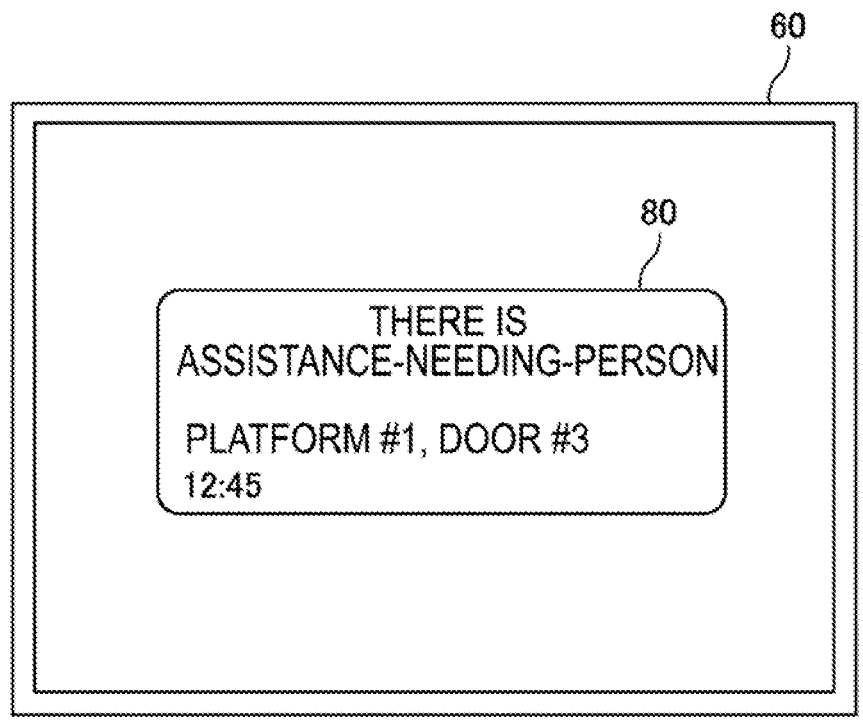
FIG. 7 is a first diagram illustrating notification indicating that the assistance-needing-person is present.

FIG. 7 is a first diagram illustrating the notification indicating that the assistance-needing-person 30 is present. In this example, the notification is a pop-up window 80 that is displayed on a display device 60. The pop-up window 80 displays an event in which an assistance-needing-person is present, the position of the person, and the time at which the person is detected.

Note that, for example, the position of the assistance-needing-person 30 can be determined based on a position where the sensor 10 used for detecting the assistance-needing-person 30 is installed. Specifically, information (hereinafter, sensor information) that indicates the location where the sensor 10 is disposed is prepared in association with the identifier of each sensor 10 disposed at the surveillance location. By using the sensor information, the decision unit 2060 determines the location associated with the identifier of the sensor 10 detecting the assistance-needing-person 30 and includes the location in the notification.

Figure 8:
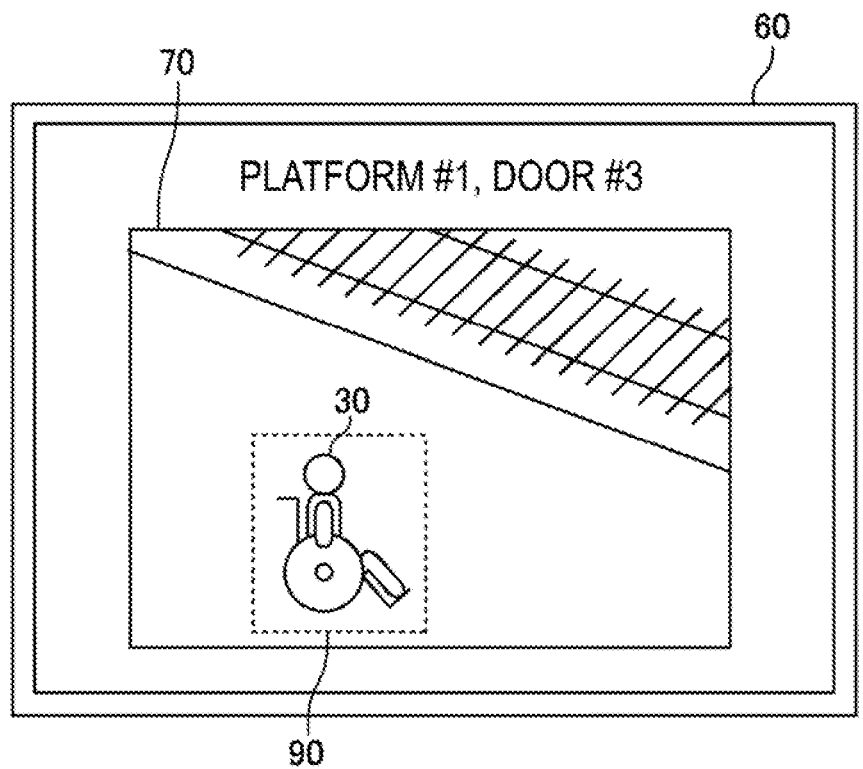
FIG. 8 is a second diagram illustrating the notification indicating that the assistance-needing-person is present.

FIG. 8 is a second diagram illustrating the notification indicating that the assistance-needing-person is present. In this example, the sensor 10 is the camera, and the camera captures a video. A video 70 that is generated by the camera is displayed at all times in real time on the display device 60. For example, the video 70 is a surveillance video that is displayed on the display device 60 installed in the security office. In addition, information that indicates the installation location of the camera generating the video 70 is displayed on the display device 60.

In the example in FIG. 8, the notification performed by the notification unit 2080 is a highlight display of the assistanceneeding-person 30. Specifically, a frame 90 surrounding the assistance-needing-person 30 is the notification performed by the notification unit 2080. In a case where the assistance-needing-person 30 is detected, and the assister 40 is not detected for the assistance-needing-person 30, the notification unit 2080 displays the frame 90 for the assistance-needing-person 30 included in the video 70.

Note that the highlight display of the assistance-needing-person 30 is not limited to the method of displaying the frame surrounding the assistance-needing-person 30. For example, the notification unit 2080 performs the highlight display of the assistance-needing-person 30 using a method of displaying a pop-up window near the assistance-needing-person 30 or changing the color of the assistance-needing-person 30.

By performing the notification in a case where the assister 40 is not present for the assistance-needing-person 30, and not performing the notification in a case where the assister 40 is present for the assistance-needing-person 30, the notification is performed in only a situation requiring particular attention like the "presence of the assistance-needing-person 30 who is not assisted". By limiting the situation where the notification is performed to the situation requiring particular attention, occurrence of a problem of overlooking the notification performed in the situation requiring particular attention can be reduced.

<Decision of Notification Content: S106>

As described above, the decision unit 2060 performs any one or more of (1) decision as to whether or not to perform the notification related to the assistance-needing-person 30 and (2) decision of the type of notification related to the assistance-needing-person 30 based on the detection results of the first detection unit 2020 and the second detection unit 2040 (S106). The case of (2) will be described.

For example, when the assistance-needing-person 30 is detected, the decision unit 2060 decides different notification contents between a case where the assister 40 is detected for the assistance-needing-person 30 and a case where the assister 40 is not detected for the assistance-needing-person 30. It can be said that a situation where the assister 40 is not detected for the assistance-needing-person 30 is a situation that requires more attention of the staff, the security guard, or the like than a situation where the assister 40 is detected for the assistance-needing-person 30. Thus, it is preferable that the notification performed in the former situation is notification that is more easily recognized by a person than the notification performed in the latter situation. Therefore, for example, by using various methods, the decision unit 2060 highlights the notification performed in the situation where the assister 40 is not detected for the assistance-needing-person 30.

Figure 9A:
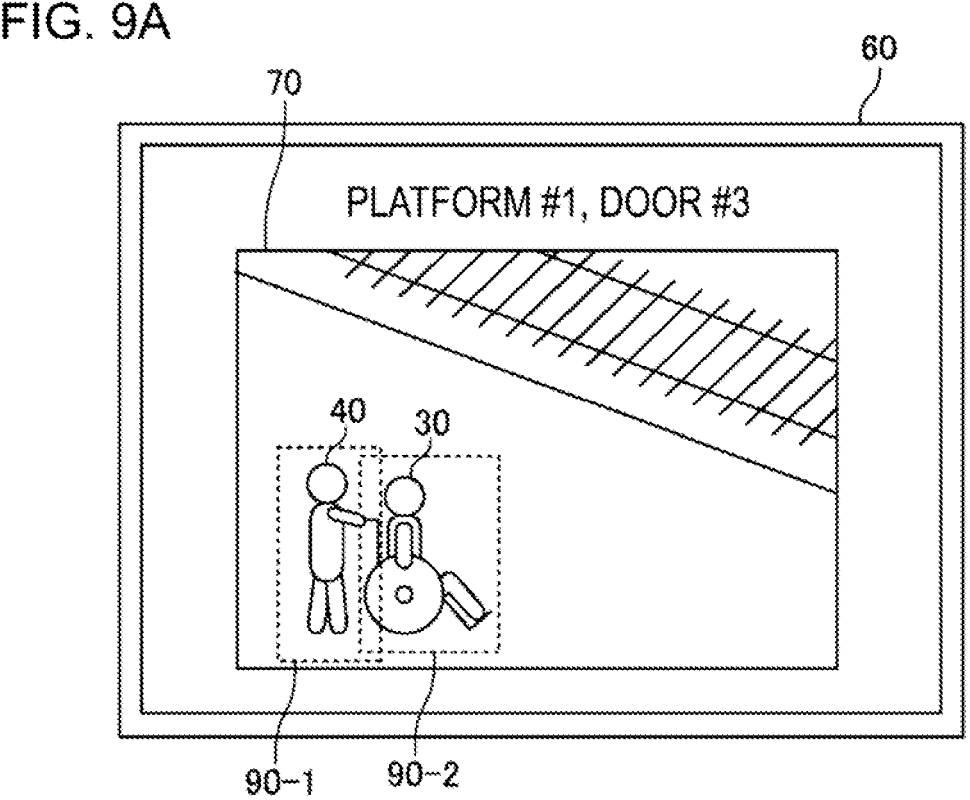
FIGS. 9A and 9B are diagrams illustrating a case where a notification content varies depending on whether or not the assister is detected for the assistance-needing-person.
Figure 9B:
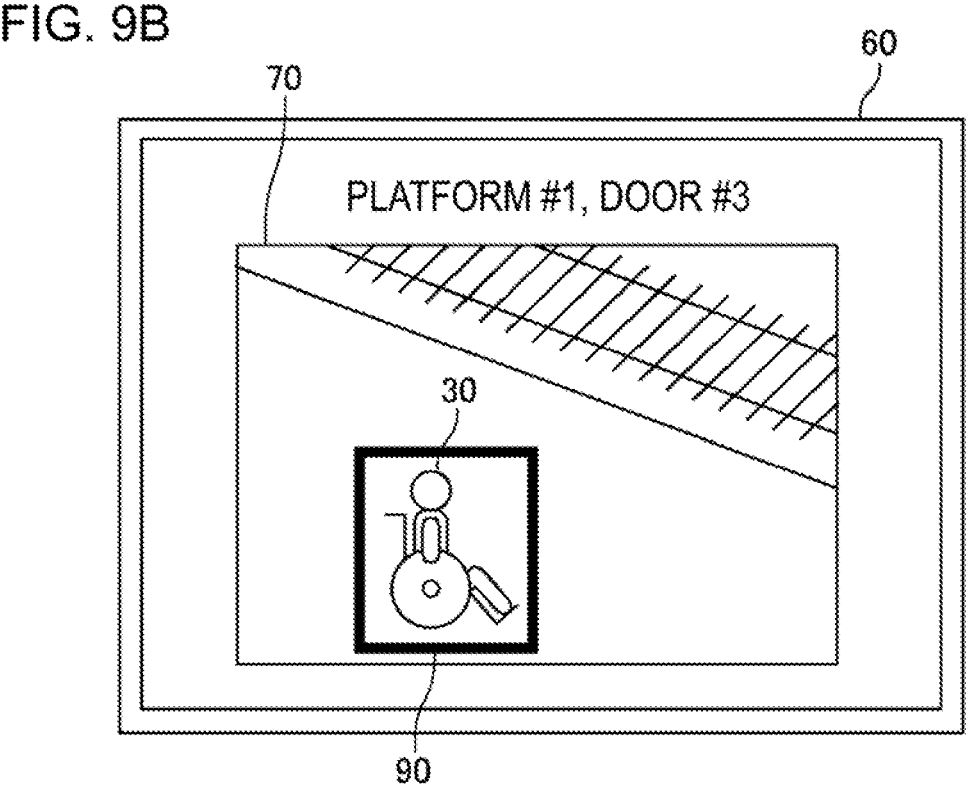

FIGS. 9A and 9B are diagrams illustrating a case where the notification content varies depending on whether or not the assister 40 is detected for the assistance-needing-person 30. In FIG. 9A, the assister 40 is present for the assistance-needing-person 30. On the other hand, in FIG. 9B, the assister 40 is not present for the assistance-needing-person 30.

The notification in FIG. 9A is a dotted line frame surrounding the assistance-needing-person 30 and the assister 40. On the other hand, the notification in FIG. 9B is a bold solid line frame surrounding the assistance-needing-person 30. Thus, it can be said that the notification in the case of FIG. 9B where the assister 40 is not present for the assistance-needing-person 30 is notification that is more easily recognized by a person than the notification in the case of FIG. 9A where the assister 40 is present for the assistance-needing-person 30.

Note that notification that is easily recognized by a person is not limited to the bold line frame. For example, the notification unit 2080 sets the color of the frame surrounding the assistance-needing-person 30 in a case where the assister 40 is not present for the assistance-needing-person 30 to a more distinctive color than the color of the frame surrounding the assistance-needing-person 30 and the assister 40 in a case where the assister 40 is present for the assistance-needing-person 30. Besides, for example, in a case where the assister 40 is not present for the assistance-needing-person 30, the notification unit 2080 may display the frame surrounding the assistance-needing-person 30 and also a message indicating that the assistance-needing-person 30 without the assister 40 is present.

By performing the notification of the content corresponding to the presence or absence of the assister 40, the assistance-needing-person 30 can be perceived regardless of whether or not the assister 40 is present, and the assistance-needing-person 30 for which the assister 40 is not present can be perceived as a person requiring particular attention.

<Tracking of Assistance-Needing-Person 30 and Assister 40>

It is preferable that the information processing apparatus 2000 checks whether or not the presence of the assister 40 continues for the assistance-needing-person 30 by tracking the combination of the assistance-needing-person 30 and the assister 40 that are detected once. For example, after the assister 40 is detected for the assistance-needing-person 30, the information processing apparatus 2000 tracks a change in position of the assistance-needing-person 30 and the assister 40 and determines whether or not the presence of the assister 40 continues within a predetermined distance from the assistance-needing-person 30. For example, in a case where a state where the distance between the assistance-needing-person 30 and the assister 40 is greater than the predetermined distance continues for a predetermined period or longer, the information processing apparatus 2000 determines that the assister 40 does not assist the assistance-needing-person 30. That is, the assistance-needing-person 30 is changed from the assistance-needing-person 30 for which the assister 40 is present to the assistance-needing-person 30 for which the assister 40 is not present. By receiving this change, the information processing apparatus 2000 performs the notification related to the assistance-needing-person 30. The notification performed here is the notification in a case where the assistance-needing-person 30 for which the assister 40 is not present is detected.

<Modification Example>

Figure 10:
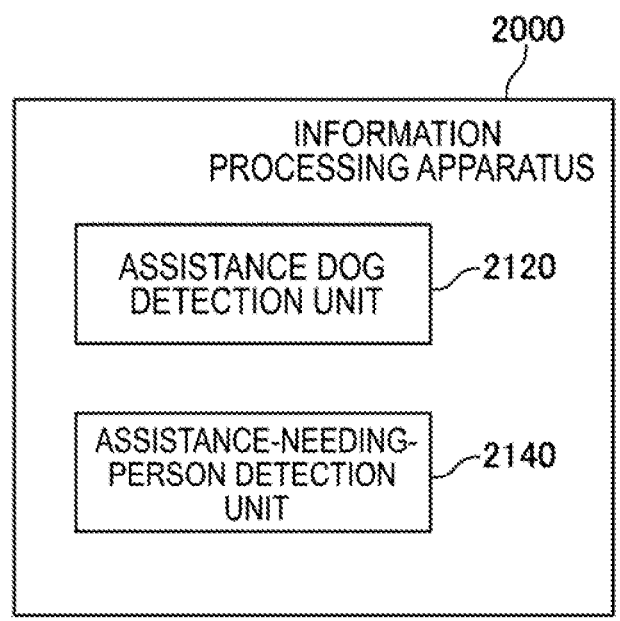
FIG. 10 is a diagram illustrating a functional configuration of a modification example of the information processing apparatus of Example Embodiment 1.

FIG. 10 is a diagram illustrating a functional configuration of a modification example (hereinafter, the information processing apparatus 2000 of the modification example) of the information processing apparatus 2000 of Example Embodiment 1. The information processing apparatus 2000 includes an assistance dog detection unit 2120 and an assistance-needing-person detection unit 2140. Note that a method of detecting the assistance dog is the same as described above. The assistance dog detection unit 2120 detects the assistance dog using the detection result of the sensor 10. The assistance-needing-person detection unit 2140 detects the assistance-needing-person 30 who is positioned around the assistance dog. A method of detecting the assistance-needing-person 30 depending on the detection of the assistance dog is the same as the method of detecting the assistance-needing-person 30 after detecting the assister 40.

According to the information processing apparatus 2000 of the modification example, the assistance-needing-person (person having a vision disability or the like) assisted by the assistance dog can be easily detected.

Example Embodiment 2

Figure 11:
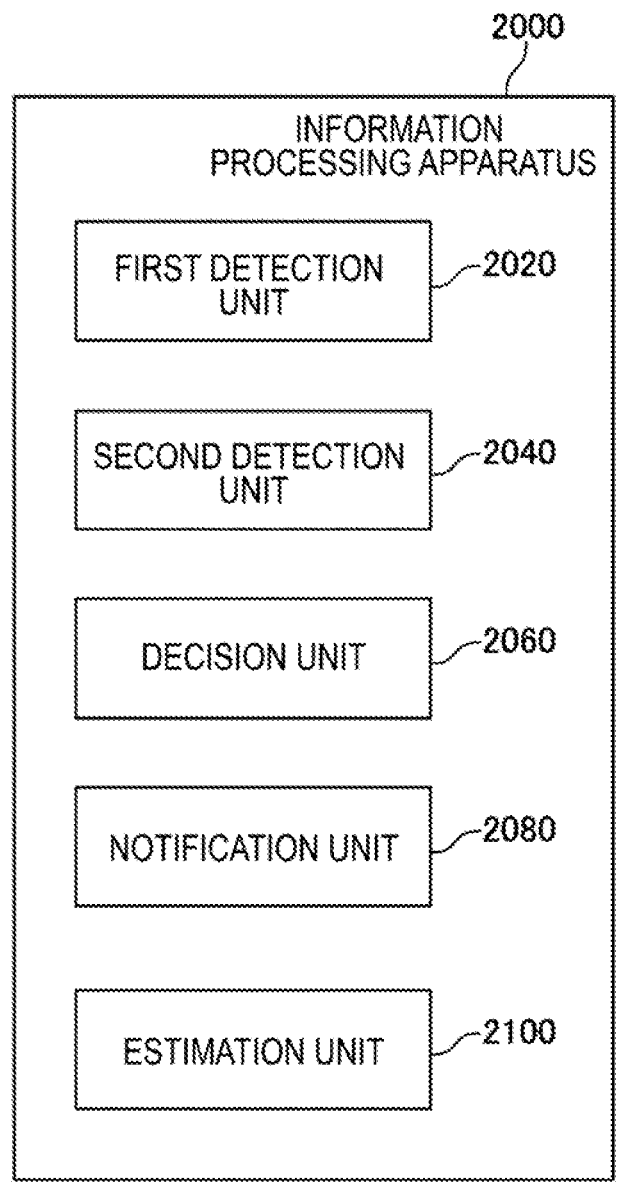
FIG. 11 is a block diagram illustrating a functional configuration of an information processing apparatus of Example Embodiment 2.

FIG. 11 is a block diagram illustrating a functional configuration of the information processing apparatus 2000 of Example Embodiment 2. The information processing apparatus 2000 of Example Embodiment 2 has the same function as the information processing apparatus 2000 of Example Embodiment 1 except for the points described below.

The information processing apparatus 2000 of Example Embodiment 2 includes an estimation unit 2100. The estimation unit 2100 estimates the situation of the assistance-needing-person 30. The decision unit 2060 of Example Embodiment 2 performs the decision related to the notification considering the detection results of the first detection unit 2020 and the second detection unit 2040 and also the situation of the assistance-needing-person 30.

<Case of Deciding Whether or not to Perform Notification>

The information processing apparatus 2000 defines a plurality of conditions (hereinafter, situation conditions) related to the situation of the assistance-needing-person 30 as a condition for deciding whether or not to perform the notification. Ranks are assigned to the plurality of situation conditions in descending order of necessity of performing the notification. FIG. 12 is a diagram illustrating the situation conditions to which the ranks are assigned in a table format. The table in FIG. 12 will be referred to as a table 300. The table 300 includes two columns of a rank 302 and a situation condition 304. As the value of the rank 302 associated with the situation condition 304 is increased, the necessity of the notification for the situation represented by the situation condition 304 is increased. For example, a situation of "entering a dangerous location" is a situation having the highest necessity of performing the notification and thus, is associated with a rank having the highest value.

From the situation conditions, the decision unit 2060 determines the condition corresponding to the situation of the assistance-needing-person 30 detected using the sensor 10. Furthermore, the decision unit 2060 determines whether or not the rank of the determined situation condition is a rank of greater than or equal to a predetermined value. In a case where the rank of the determined situation condition is greater than or equal to the predetermined value, the decision unit 2060 decides to perform the notification. On the other hand, in a case where the rank of the determined situation condition is smaller than the predetermined value, the decision unit 2060 decides not to perform the notification. Note that in a case where a plurality of situation conditions corresponding to the situation of the assistance-needing-person 30 detected using the sensor 10 are determined, the decision unit 2060 uses the situation condition having the highest rank in the decision among the determined situation conditions.

The decision unit 2060 decides the predetermined value depending on whether or not the assister 40 is present for the assistance-needing-person 30. For example, a predetermined value Ta1 used for a case where the assister 40 is present for the assistance-needing-person 30, and a predetermined value Ta2 used for a case where the assister 40 is not present for the assistance-needing-person 30 are defined in advance. Note that Ta1 is a value higher than Ta2. In a case where the assister 40 is detected for the assistance-needing-person 30, the decision unit 2060 uses the predetermined value Ta1 as the predetermined value to be used for comparison with the rank of the situation condition corresponding to the situation of the assistance-needing-person 30. On the other hand, in a case where the assister 40 is not detected for the assistance-needing-person 30, the decision unit 2060 uses the predetermined value Ta2 as the predetermined value to be used for comparison with the situation condition corresponding to the situation of the assistance-needing-person 30.

Figure 13:
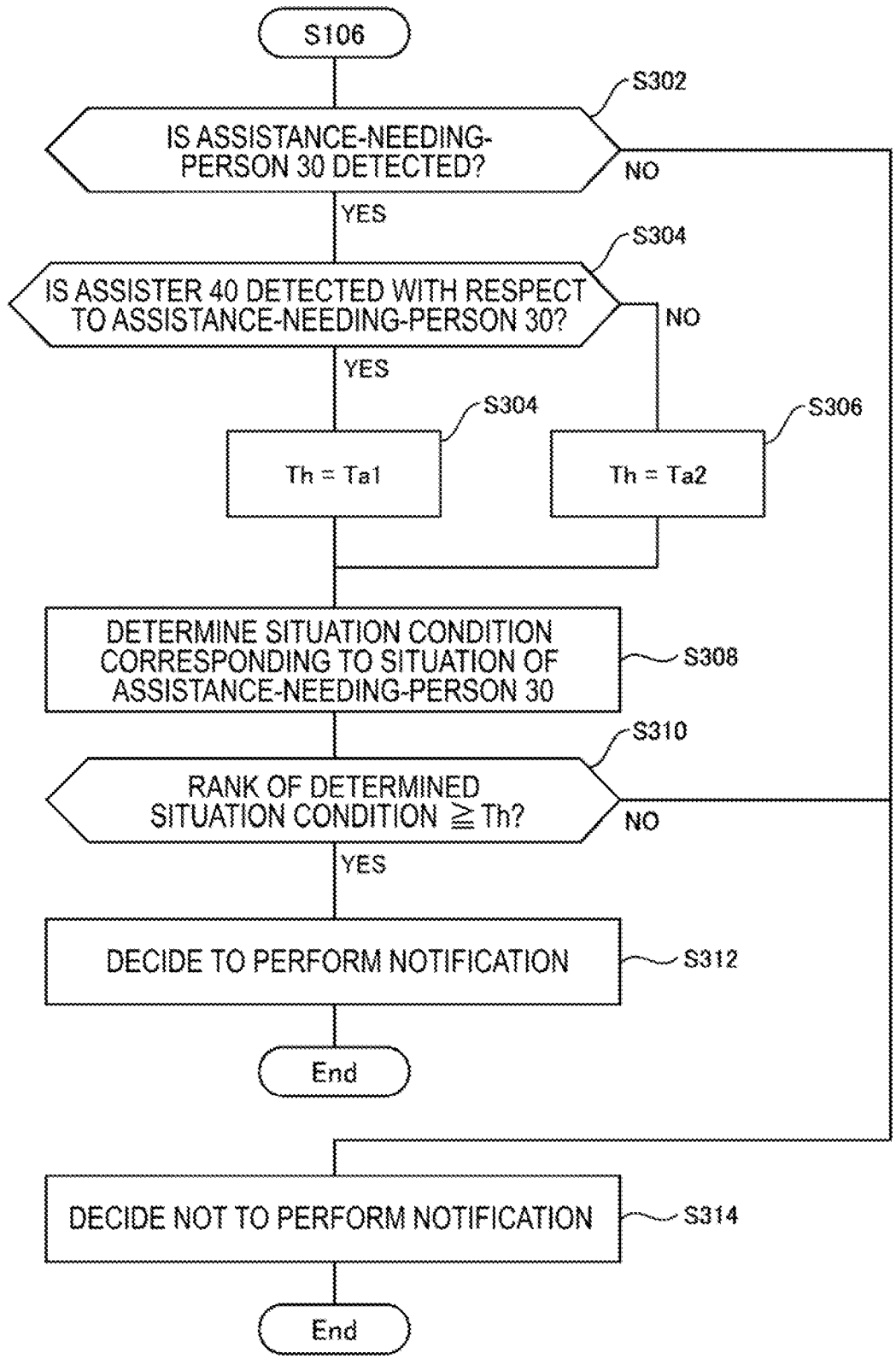
FIG. 13 is a flowchart illustrating a flow of process of deciding whether or not to perform the notification depending on a situation of the assistance-needing-person.

FIG. 13 is a flowchart illustrating a flow of process of deciding whether or not to perform the notification depending on the situation of the assistance-needing-person 30 in the information processing apparatus 2000 of Example Embodiment 2. The decision unit 2060 determines whether or not the assistance-needing-person 30 is detected (S302). In a case where the assistance-needing-person 30 is detected (S302: YES), the decision unit 2060 determines whether or not the assister 40 is detected for the assistance-needing-person 30 (S304). In a case where the assister 40 is detected for the assistance-needing-person 30 (S304: YES), the decision unit 2060 sets Ta1 as a predetermined value Th (S306). In a case where the assister 40 is not detected for the assistance-needing-person 30 (S304: NO), the decision unit 2060 sets Ta2 as the predetermined value Th (S308). As described above, Ta1 is a value higher than Ta2.

After S308, the decision unit 2060 determines the situation condition corresponding to the situation of the assistance-needing-person 30 (S310). The decision unit 2060 determines whether or not the rank of the determined situation condition is greater than or equal to Th (S312). In a case where the rank of the determined situation condition is greater than or equal to Th (S312: YES), the decision unit 2060 decides to perform the notification (S314). On the other hand, in a case where the rank of the determined situation condition is smaller than Th (S312: NO), or in a case where the assistance-needing-person 30 is not detected (S302: NO), the decision unit 2060 decides not to perform the notification (S316).

In the determination as to whether or not to perform the notification depending on the situation of the assistance-needing-person 30, by changing a determination reference depending on whether or not the assister 40 is present for the assistance-needing-person 30, the necessity of the notification can be more flexibly decided.

<Case of Deciding Notification Content>

For example, the decision unit 2060 decides different notification contents between a case where the rank of the situation condition corresponding to the situation of the assistance-needing-person 30 is greater than or equal to the predetermined value and the opposite case. As described above, the predetermined value is decided (Ta1 or Ta2) based on whether or not the assister 40 is detected.

For example, the content of the notification in a case where the rank of the situation condition corresponding to the situation of the assistance-needing-person 30 is greater than or equal to the predetermined value is the same as the content of the notification in a case where the assister 40 is detected for the assistance-needing-person 30 in Example Embodiment 1 (refer to FIG. 9B). On the other hand, for example, the content of the notification in a case where the rank of the situation condition corresponding to the situation of the assistance-needing-person 30 is smaller than the predetermined value is the same as the content of the notification in a case where the assister 40 is detected for the assistance-needing-person 30 in Example Embodiment 1 (refer to FIG. 9A).

Figure 14:
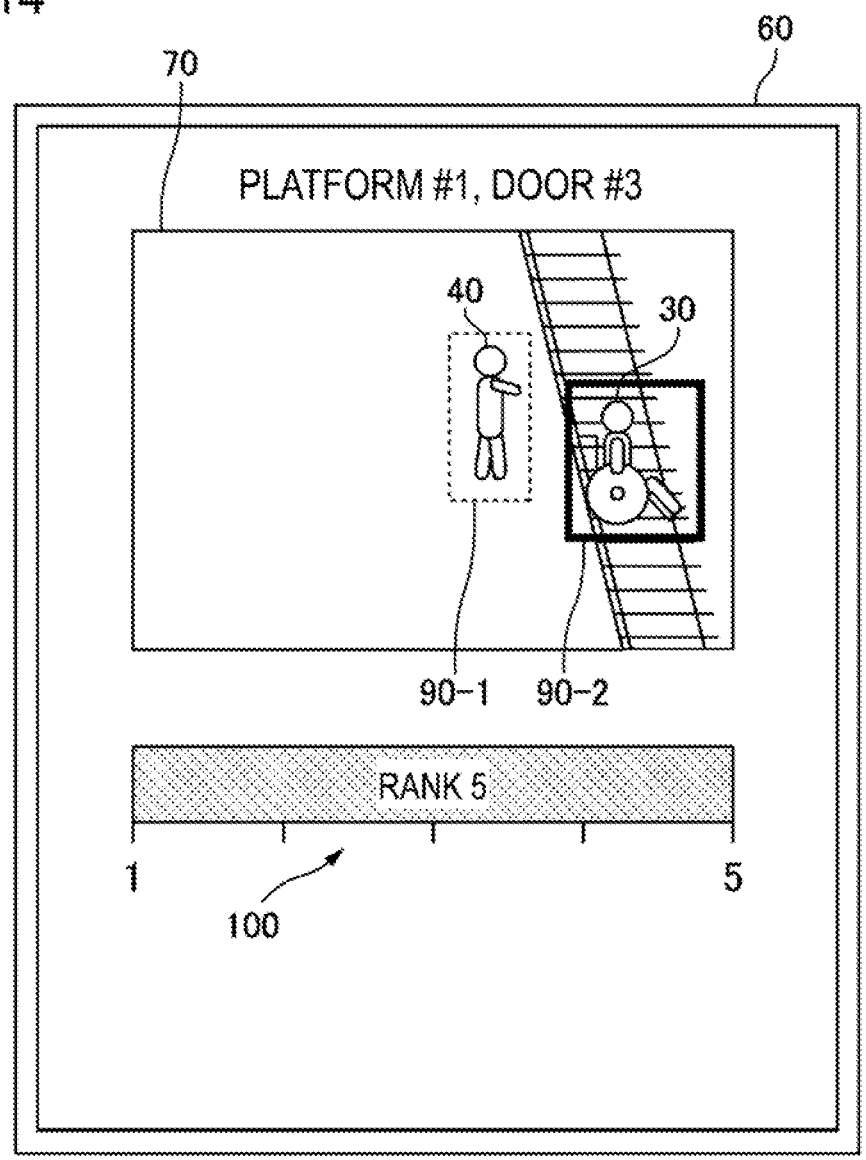
FIG. 14 is a diagram illustrating notification indicating the rank of the situation condition corresponding to the situation of the assistance-needing-person.

Besides, for example, the decision unit 2060 may include the rank of the situation condition corresponding to the situation of the assistance-needing-person 30 or the situation condition in the notification. FIG. 14 is a diagram illustrating the notification indicating the rank of the situation condition corresponding to the situation of the assistance-needing-person 30. In FIG. 14, the assistance-needing-person 30 falls on a railroad. This case corresponds to "entering a dangerous location" shown in the table 300 in FIG. 12. Thus, the rank of the situation condition is 5. Therefore, a display 100 of "rank 5" is displayed on the display device 60 in FIG. 14. The display 100 represents the magnitude of the rank of the situation condition corresponding to the situation of the assistance-needing-person 30 by the text string "rank 5" and also the size of the range of a bar filled with color.

In the decision of the notification content depending on the situation of the assistance-needing-person 30, by changing a setting reference of the notification content depending on whether or not the assister 40 is present for the assistance-needing-person 30, the notification content can be more flexibly decided.

<Example of Hardware Configuration>

For example, a hardware configuration of a computer that implements the information processing apparatus 2000 of Example Embodiment 2 is represented by FIG. 3 in the same manner as Example Embodiment 1. However, the storage device 1080 of the computer 1000 implementing the information processing apparatus 2000 of the present example embodiment further stores a program module that implements the function of the information processing apparatus 2000 of the present example embodiment.

Example Embodiment 3

A functional configuration of the information processing apparatus 2000 of Example Embodiment 3 is the same as the functional configuration of the information processing apparatus 2000 of Example Embodiment 1 or Example Embodiment 2. The information processing apparatus 2000 of Example Embodiment 3 has the same function as the information processing apparatus 2000 of Example Embodiment 1 or Example Embodiment 2 except for the points described below.

The second detection unit 2040 of Example Embodiment 3 estimates the attribute of the assister 40. The decision unit 2060 of Example Embodiment 3 performs the decision related to the notification based on the attribute of the assister 40.

The attribute of the assister 40 is the age bracket of the assister 40, the sex of the assister 40, whether or not the assister 40 is an ill person or a person in bad condition, whether the assister 40 is a person or an animal, or the like. In a case where a plurality of assisters 40 corresponding to the assistance-needing-person 30 are present, the number of assisters 40 may be handled as the attribute of the assister 40. In Example Embodiment 3, the sensor used for detecting the assister 40 is the camera. The second detection unit 2040 estimates the attribute of the assister 40 using the captured image 20. Note that existing technologies can be used in a method of estimating the age bracket or the sex of the person or identifying the person or the animal using the captured image. In addition, the method (method of determining based on the course of movement or the pose) which is described as a method of detecting an ill person or a person in bad condition as the assistance-needing-person 30 can be used as a method of determining whether the assister 40 is an ill person or a person in bad condition.

<Case of Deciding Whether or not to Perform Notification>

For example, the decision unit 2060 determines whether or not the assistance provided by the assister 40 is sufficient based on the attribute of the assister 40. In a case where the assistance provided by the assister 40 is sufficient, the decision unit 2060 decides not to perform the notification. In a case where the assistance provided by the assister 40 is not sufficient, the decision unit 2060 decides to perform the notification.

For example, whether or not sufficient assistance is provided by the assister 40 is determined depending on whether or not the attribute of the assister 40 satisfies a predetermined condition. Specifically, in a case where the attribute of the assister 40 satisfies the predetermined condition, the decision unit 2060 decides not to perform the notification. In a case where the attribute of the assister 40 does not satisfy the predetermined condition, the decision unit 2060 decides to perform the notification. For example, the predetermined condition is that the age bracket of the assister 40 does not correspond to a senior person or a child, the sex of the assister 40 is male, the assister 40 is not an ill person nor a person in bad condition, or the assister 40 is not an animal and is a person.

Figure 15:
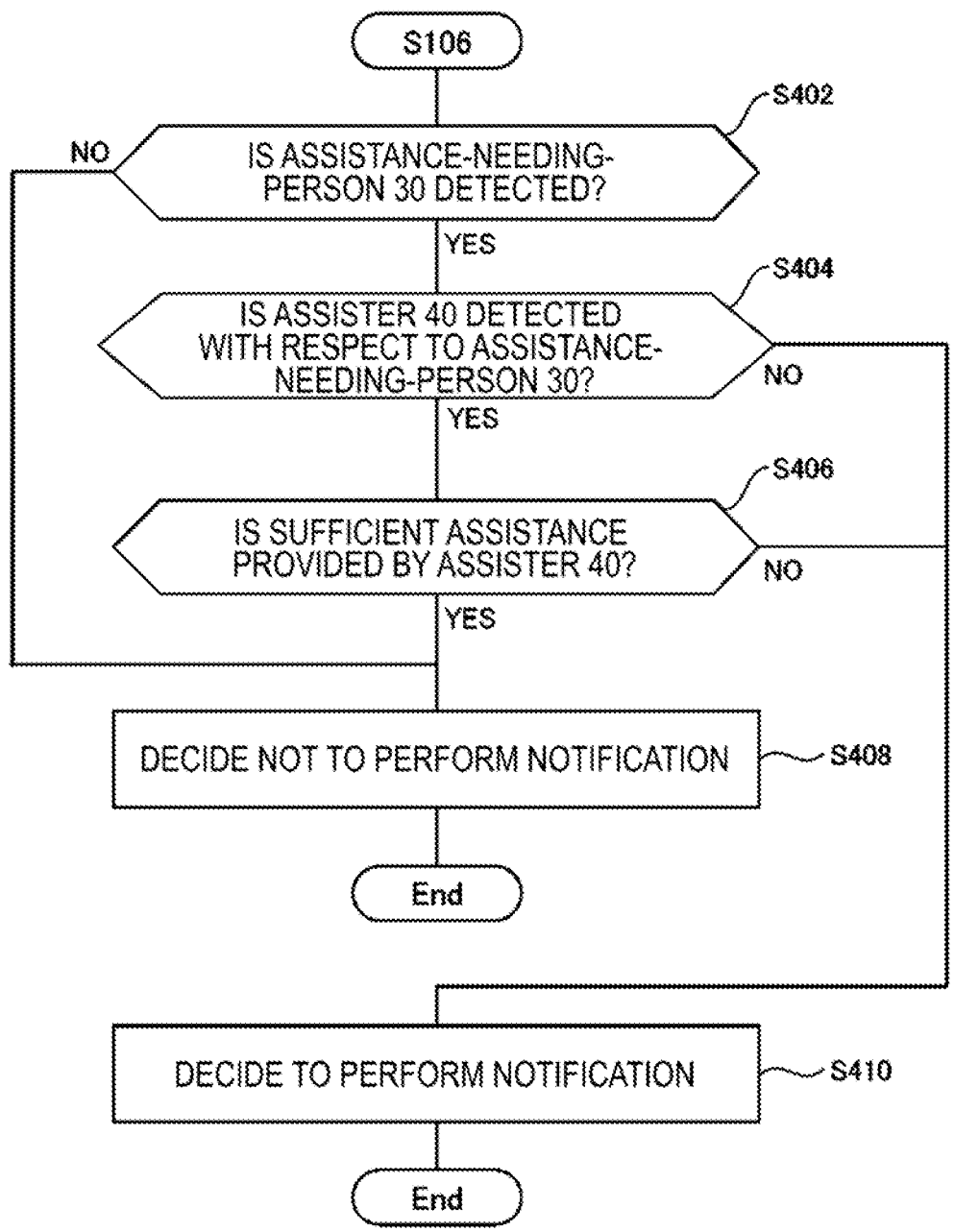
FIG. 15 is a flowchart illustrating a flow of process of deciding whether or not to perform the notification based on an attribute of the assister.

FIG. 15 is a flowchart illustrating a flow of process of deciding whether or not to perform the notification based on the attribute of the assister 40. The decision unit 2060 determines whether or not the assistance-needing-person 30 is detected (S402). In a case where the assistance-needing-person 30 is not detected (S402: NO), the decision unit 2060 decides not to perform the notification (S408). In a case where the assistance-needing-person 30 is detected (S402: YES), the decision unit 2060 determines whether or not the assister 40 is detected for the assistance-needing-person 30 (S404). In a case where the assister 40 is not detected for the assistance-needing-person 30 (S404: NO), the decision unit 2060 decides to perform the notification (S410). In a case where the assister 40 is detected for the assistance-needing-person 30 (S404: YES), the decision unit 2060 determines whether or not sufficient assistance is provided by the assister 40 based on the attribute of the assister 40 (S406). In a case where sufficient assistance is provided by the assister 40 (S406: YES), the decision unit 2060 decides not to perform the notification (S408). In a case where sufficient assistance is not provided by the assister 40 (S406: NO), the decision unit 2060 decides to perform the notification (S410).

Whether or not sufficient assistance is provided by the assister 40 may be determined considering the attribute of the assister 40 and also the attribute of the assistance-needing-person 30. For example, the decision unit 2060 computes a first index value representing the level of assistance provided by the assister 40 based on the attribute of the assister 40. Furthermore, the decision unit 2060 computes a second index value representing the level of assistance necessary for the assistance-needing-person 30 based on the attribute of the assistance-needing-person 30. In a case where the first index value is greater than or equal to the second index value, the decision unit 2060 determines that sufficient assistance is provided by the assister 40. On the other hand, in a case where the first index value is smaller than the second index value, the decision unit 2060 determines that sufficient assistance is not provided by the assister 40.

The first index value is computed based on the attribute of the assister 40. For example, a score that corresponds to the value of each attribute (the age bracket, the sex, and the like)

of the assister 40 is set in advance. For example, for the age bracket of the assister 40, the score in a case where the age bracket of the assister 40 corresponds to a senior person or a child is set to 1. The score in a case where the age bracket of the assister 40 does not correspond to a senior person nor a child is set to 5. The decision unit 2060 handles a cumulative value computed by accumulating the score corresponding to each attribute of the assister 40 as the first index value. The second index value is computed using the same method.

<Case of Deciding Notification Content>

For example, the decision unit 2060 determines whether or not sufficient assistance is provided by the assister 40 based on the attribute of the assister 40. The decision unit 2060 sets different notification contents between a case where sufficient assistance is provided by the assister 40 and a case where sufficient assistance is not provided by the assister 40. For example, the content of the notification in a case where sufficient assistance is provided by the assister 40 is the same as the content of the notification in a case where the assister 40 is detected for the assistance-needing-person 30 in Example Embodiment 1 (refer to FIG. 9B). On the on the other hand, for example, the content of the notification in a case where sufficient assistance is not provided by the assister 40 is the same as the content of the notification in a case where the assister 40 is detected for the assistance-needing-person 30 in Example Embodiment 1 (refer to FIG. 9A). Note that a method of determining whether or not sufficient assistance is provided by the assister 40 is the same as described above.

<Consideration of Situation of Assistance-Needing-Person 30>

The decision unit 2060 may consider the situation of the assistance-needing-person 30 estimated by the estimation unit 2100 in the same manner as the decision unit 2060 of Example Embodiment 2. In this case, for example, the decision unit 2060 sets different predetermined values to be used for comparison with the situation condition among three cases including a case where sufficient assistance is provided by the assister 40 (that is, a case where the attribute of the assister 40 satisfies the predetermined condition), a case where sufficient assistance is not provided by the assister 40 (that is, a case where the attribute of the assister 40 does not satisfy the predetermined condition), and a case where the assister 40 is not present. Specifically, a predetermined value Tb1 in a case where sufficient assistance is provided by the assister 40, a predetermined value Tb2 in a case where sufficient assistance is not provided by the assister 40, and a predetermined value Tb3 in a case where the assister 40 is not present are defined in advance. Note that the predetermined values satisfy a relationship Tb1>Tb2>Tb3.

The decision unit 2060 sets the predetermined value to be used for comparison with the situation condition depending on the presence or absence of the assister 40 and whether or not sufficient assistance is provided by the assister 40. In a case where the assister 40 is detected by the second detection unit 2040, and sufficient assistance is provided by the assister 40, the decision unit 2060 sets Tb1 as the predetermined value to be used for comparison with the situation condition corresponding to the situation of the assistance-needing-person 30. In a case where the assister 40 is detected by the second detection unit 2040, and sufficient assistance is not provided by the assister 40, the decision unit 2060 sets Tb2 as the predetermined value to be used for comparison with the situation condition corresponding to the situation of the assistance-needing-person 30. In a case where the assister 40 is not detected by the second detection unit 2040, the decision unit 2060 sets Tb3 as the predetermined value to be used for comparison with the situation condition corresponding to the situation of the assistance-needing-person 30.

Note that a method of deciding whether or not to perform the notification and the content of the notification based on the comparison between the situation condition and the predetermined value is the same as described in Example Embodiment 2.

<Example of Hardware Configuration>

For example, a hardware configuration of a computer that implements the information processing apparatus 2000 of Example Embodiment 3 is represented by FIG. 3 in the same manner as Example Embodiment 1. However, the storage device 1080 of the computer 1000 implementing the information processing apparatus 2000 of the present example embodiment further stores a program module that implements the function of the information processing apparatus 2000 of the present example embodiment.

While the example embodiments of the present invention are described with reference to the drawings, the example embodiments are illustrations of the present invention. Various configurations other than those described above can be employed.

For example, in a case where a predetermined condition is satisfied for the assistance-needing-person 30, the information processing apparatus 2000 may perform the notification regardless of the detection result of the assister 40. For example, the predetermined condition is a condition that the situation of the assistance-needing-person 30 is a dangerous situation (for example, entering on the railroad).

The invention claimed is:

1. An information processing apparatus comprising:
   a processor; and
   a memory storing executable instructions that, when executed by the processor, causes the processor to perform as:
   a first detection unit that detects a person satisfying a predetermined condition in an image;
   a second detection unit that detects an accompanying person present around the detected person in the same image;
   a decision unit that performs any one or more of decision as to whether or not to perform notification related to the person and decision of a content of the notification based on detection results of the first detection unit and the second detection unit; and
   a notification unit that performs the notification based on the decision,
   wherein
   the accompanying person includes at least one of a person pushing a wheelchair, a person guiding the person detected by the first detection unit, a person supporting the body of the person detected by the first detection unit, and a person who is in contact with the person detected by the first detection unit for a predetermined period or longer, and
   the decision unit decides that the notification is not performed in a case where the decision results indicate that the accompanying person who is present around is detected by the second detection unit around the person detected by the first detection unit.

2. The information processing apparatus according to claim 1,
   wherein the person is an assistance-needing-person who needs assistance, and the accompanying person is an assister who assists the assistance-needing-person.

3. The information processing apparatus according to claim 2, wherein the processor further performs as:
an estimation unit that estimates a situation of the assistance-needing-person using a captured image,
wherein the decision unit performs any one or more of the decision as to whether or not to perform the notification and the decision of the content of the notification based on the situation of the assistance-needing-person.

4. The information processing apparatus according to claim 3,
wherein a rank is assigned to each of a plurality of conditions related to the situation of the assistance-needing-person,
the decision unit performs any one or more of the decision as to whether or not to perform the notification and the decision of the content of the notification depending on whether or not the rank of the condition corresponding to the situation of the assistance-needing-person estimated by the estimation unit is greater than or equal to a predetermined value, and
the predetermined value in a case where the assister is detected for the assistance-needing-person is set to a higher value than the predetermined value in a case where the assister is not detected for the assistance-needing-person.

5. The information processing apparatus according to claim 2,
wherein the decision unit determines whether or not sufficient assistance is provided by the assister based on an attribute of the assister, and performs any one or more of the decision as to whether or not to perform the notification and the decision of the content of the notification based on a result of the determination.

6. The information processing apparatus according to claim 5,
wherein the decision unit performs:
computing a first index value representing a level of assistance providable by the assister based on the attribute of the assister;
determining a second index value representing the level of assistance necessary for the assistance-needing-person based on an attribute of the assistance-needing-person; and
performing any one or more of the decision as to whether or not to perform the notification and the decision of the content of the notification based on a magnitude relationship between the first index value and the second index value.

7. A computer-implemented control method, comprising:
detecting a person satisfying a predetermined condition in an image;
detecting an accompanying person present around the detected person in the same image;
performing any one or more of decision as to whether or not to perform notification related to the person and decision of a content of the notification based on detection results of the detecting a person and the detecting an object; and
performing the notification based on the decision,
wherein
the accompanying person includes at least one of a person pushing a wheelchair, a person guiding the person detected, a person supporting the body of the detected person, and a person who is in contact with the detected person for a predetermined period or longer, and
not performing the notification in a case where the decision results indicate that the accompanying person is present around detected person.

8. The control method according to claim 7,
wherein the person is an assistance-needing-person who needs assistance, and
the accompanying person is an assister who assists the assistance-needing-person.

9. The control method according to claim 8, further comprising:
estimating a situation of the assistance-needing-person using a captured image,
wherein any one or more of the decision as to whether or not to perform the notification and the decision of the content of the notification are performed based on the situation of the assistance-needing-person.

10. The control method according to claim 9,
wherein a rank is assigned to each of a plurality of conditions related to the situation of the assistance-needing-person,
any one or more of the decision as to whether or not to perform the notification and the decision of the content of the notification are performed depending on whether or not the rank of the condition corresponding to the situation of the assistance-needing-person is greater than or equal to a predetermined value, and
the predetermined value in a case where the assister is detected for the assistance-needing-person is set to a higher value than the predetermined value in a case where the assister is not detected for the assistance-needing-person.

11. The control method according to claim 8,
wherein a determination as to whether or not sufficient assistance is provided by the assister is performed based on an attribute of the assister, and any one or more of the decision as to whether or not to perform the notification and the decision of the content of the notification are performed based on a result of the determination.

12. The control method according to claim 11,
wherein a first index value representing a level of assistance providable by the assister is computed based on the attribute of the assister,
a second index value representing the level of assistance necessary for the assistance-needing-person is determined based on an attribute of the assistance-needing-person, and
any one or more of the decision as to whether or not to perform the notification and the decision of the content of the notification are performed based on a magnitude relationship between the first index value and the second index value.

13. A non-transitory computer-readable medium storing a program causing a computer to execute the control method according to claim 7.

14. The information processing apparatus according to claim 1,
wherein
the first detection unit and the second detection unit perform the detection using at least one of a pressure sensor and a camera,
the pressure sensor is installed on the ground where a person passes,
in case where the camera is used by the first detection unit and the second detection unit, the first detection unit detects the person by analyzing the image generated by the camera, and the second detection unit detects the accompanying person by analyzing the image which includes the person detected by the first detection unit, and the decision unit decides that the notification is not performed in a case where the decision results indicate that the accompanying person who is present around is detected by the second detection unit around the person detected by the first detection unit.

15. The information processing apparatus according to claim 1, wherein the decision unit decides that the notification is not performed in a case where both of the person satisfying the predetermined condition and the accompanying person around the detected person are detected in the same image by respectively the first unit and the second unit, and the decision unit decides that the notification is performed in a case where in the same image the person satisfying the predetermined condition is detected by the first detection unit and the accompanying person is not detected by the second detection unit.

16. The information processing apparatus according to claim 1, wherein the decision unit decides the content of the notification so as to make it different between in a case where both of the person satisfying the predetermined condition and the accompanying person around the detected person are detected and in a case where the person satisfying the predetermined condition is detected by the first detection unit and the accompanying person is not detected by the second detection unit.

17. The information processing apparatus according to claim 1, wherein the second detection unit detects, using a plurality of captured images in time series, as the accompanying person, a person who is present for a predetermined period or longer at a position within a predetermined distance from the person detected by the first detection unit.

* * * * *